US010430805B2

(12) United States Patent
Soderberg et al.

(10) Patent No.: US 10,430,805 B2
(45) Date of Patent: Oct. 1, 2019

(54) SEMANTIC ENRICHMENT OF TRAJECTORY DATA

(71) Applicant: Samsung Electronics Co., Ltd., Gyeonggi-Do (KR)

(72) Inventors: Joakim Soderberg, San Francisco, CA (US); Edwin A. Heredia, San Jose, CA (US); Pavan Kapanipathi, Fairborn, OH (US); Glenn Algie, Mountain View, CA (US); Alan Messer, Los Gatos, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 584 days.

(21) Appl. No.: 14/928,599

(22) Filed: Oct. 30, 2015

(65) Prior Publication Data

US 2016/0170994 A1 Jun. 16, 2016

Related U.S. Application Data

(60) Provisional application No. 62/090,330, filed on Dec. 10, 2014.

(51) Int. Cl.
*G06Q 30/02* (2012.01)
*G06F 16/435* (2019.01)
(Continued)

(52) U.S. Cl.
CPC ........... *G06Q 30/02* (2013.01); *G06F 16/435* (2019.01); *G06F 16/48* (2019.01); *G06F 16/487* (2019.01)

(58) Field of Classification Search
None
See application file for complete search history.

(56) References Cited

U.S. PATENT DOCUMENTS 7,647,349 B2 1/2010 Hubert et al.
8,078,394 B2 12/2011 Wang et al.
(Continued)

FOREIGN PATENT DOCUMENTS

EP 2393056 A1 12/2011
KR 10-2012-0071873 A 7/2012
(Continued)

OTHER PUBLICATIONS

WIPO Appln. PCT/KR2015/013483, International Search Report, dated Mar. 30, 2016, 3 pg.
(Continued)

*Primary Examiner* — Matthew J Ellis
(74) *Attorney, Agent, or Firm* — Cuenot, Forsythe & Kim, LLC

(57) ABSTRACT

Enriching trajectory data from a device may include determining, using a processor, enrichment data items related to points of presence within trajectory data. The enrichment data items may be retrieved from a data source. Enriching trajectory data may also include determining, using the processor, ranking metrics for the enrichment data items and ranking, using the processor, the enrichment data items according to the ranking metrics. One or more ranked enrichment data items, in association with the related point of presence of the trajectory data, may be provided to a device using the processor.

20 Claims, 7 Drawing Sheets

(51) Int. Cl.
*G06F 16/487* (2019.01)
*G06F 16/48* (2019.01)

(56) References Cited

U.S. PATENT DOCUMENTS

| | | | | |
|---|---|---|---|---|
| 8,145,648 | B2 | 3/2012 | Kunjithapatham et al. | |
| 8,190,605 | B2 | 5/2012 | Kuhlke et al. | |
| 9,196,072 | B2 * | 11/2015 | Oh | G06T 13/20 |
| 2006/0200309 | A1 | 9/2006 | Yu et al. | |
| 2008/0168070 | A1 | 7/2008 | Naphade et al. | |
| 2009/0167787 | A1 | 7/2009 | Bathiche et al. | |
| 2009/0216435 | A1 | 8/2009 | Zheng et al. | |
| 2009/0281726 | A1 | 11/2009 | Byrne et al. | |
| 2010/0057555 | A1 * | 3/2010 | Butterfield | G06F 17/30038 705/14.41 |
| 2010/0226582 | A1 | 9/2010 | Luo et al. | |
| 2011/0184827 | A1 | 7/2011 | Hubert | |
| 2011/0217685 | A1 | 9/2011 | Srinivasan et al. | |
| 2011/0317885 | A1 * | 12/2011 | Leung | G06F 17/30247 382/118 |
| 2012/0290950 | A1 | 11/2012 | Rapaport et al. | |
| 2013/0038756 | A1 * | 2/2013 | Cheng | H04N 21/42201 348/231.99 |
| 2013/0073546 | A1 | 3/2013 | Yan et al. | |
| 2013/0346400 | A1 * | 12/2013 | Ramsey | G06F 17/30864 707/723 |
| 2014/0026088 | A1 * | 1/2014 | Monte | G01C 21/3682 715/765 |
| 2014/0250184 | A1 | 9/2014 | Brown et al. | |
| 2015/0339288 | A1 * | 11/2015 | Baker | G06F 17/2705 704/9 |
| 2016/0224837 | A1 * | 8/2016 | Lipert | G06K 9/00288 |

FOREIGN PATENT DOCUMENTS

| | | | |
|---|---|---|---|
| WO | 0208948 | A2 | 1/2002 |
| WO | 2012115593 | A1 | 8/2012 |
| WO | 2013128061 | A1 | 9/2013 |
| WO | 2014092537 | A1 | 9/2014 |
| WO | 2016093630 | A1 | 6/2016 |

OTHER PUBLICATIONS

WIPO Appln. PCT/KR2015/013483, Written Opinion, dated Mar. 30, 2016, 5 pg.

EP Application No. 15867706.2, European Search Report, dated Aug. 29, 2017, 9 pg.

Van Aart, C. et al., "Mobile Cultural Heritage Guide: Location-Aware Semantic Search," Int'l. Conf. on Knowledge Engineering and Management by the Masses, Springer Berlin Heidelberg, pp. 257-271, Oct. 11, 2010, 15 pg.

Nixon, L. et al., "Semantics Enhancing Augmented Reaslity and Making Our Reality Smarter," In OTM Confederated International Conferences on the Move to Meaningful Internet Systems, pp. 863-870. Springer, Berlin, Heidelberg, 2012.

Becker, H. et al., "Identifying Content for Planned Events Across Social Media Sites," In Proc. of 5th ACM Int'l. Conf. on Web Search and Data Mining, pp. 533-542, ACM, 2012.

Griggs, B., "Your Facebook life in 62 seconds", [online] CNN © 2015 Cable News Network, Turner Broadcasting System, Inc., Feb. 6, 2014, retrieved from the Internet: <http://www.cnn.com/2014/02/04/tech/social-media/facebook-look-back-video/>, 3 pg.

Laiola Guimaraes, R. et al., "Creating Personalized Memories From Social Events: Community-Based Support for Multi-Camera Recordings of School Concerts", In Proc. of 19th ACM Int'l Conf. on Multimedia, pp. 303-312, ACM, Nov. 2011, 11 pg.

Hildebrand, M. et al., "Using Explicit Discourse Rules to Guide Video Enrichment", In Proc. of 22nd Int'l Conf. on World Wide Web Companion, pp. 461-464, May 2013.

Kennedy, L. et al., "Generating Diverse and Representative Image Search Results for Landmarks," In Proc. of the 17th Int'l. Conf. on World Wide Web, ACM, Apr. 21-25, 2008, 10 pg.

Madrigal, A., "How to Teach Google What a Story is", [online], The Atlantic Monthly Group © 2015, Jul. 17, 2014, retrieved from the Internet: <http://www.theatlantic.com/technology/archive/2014/07/how-does-google-teach-a-computer-to-tell-stories/373270/>, 10 pg.

Obrador, P., et al., "Supporting Personal Photo Storytelling for Social Albums" In Proc. of Int'l. Conf. on Multimedia, (MM'10) pp. 561-570, Oct. 25-29, 2010, ACM.

Rabbath, M. et al., "Automatic Creation of Photo Books From Stories in Social Media," In ACM Trans. on Multimedia Computing, Commun ications, and Applications (TOMM), vol. 7S, No. 1, Article 27, Oct. 2011, 2 pg.

Radu, A.L. et al., "Representativeness and Diversity in Photos Via Crowd-Sourced Media Analysis," In 10th Int'l. Workshop on Adaptive Multimedia Retrieval, AMR 2012, Oct. 24-25, 2012, 15 pg.

Rafatirad, S., "Context-Based Event Ontology Extension in Multimedia Applications," In Proc. of the 2013 IEEE Seventh Int'l. Conf. on Semantic Computing, pp. 278-285, IEEE, 2013.

Rizzo, G. et al., "What Fresh Media Are You Looking for?: Retrieving Media Items From Multiple Social Networks," In Proc. of 2012 Int'l. Workshop on Socially-Aware Multimedia, Oct. 29, 2012, ACM, 6 pg.

Saini, M.K., et al., "MoViMash: Online Mobile Video Mashup," In Proc. of the 20th ACM Int. Conf. on Multimedia, pp. 139-148, 2012, ACM.

Saini, M.K., et al., "Towards Storytelling by Extracting Social Information from OSN Photo's Metadata," In Proc. of 1st Int'l. Workshop on Internet-Scale Multimedia Management, Nov. 7, 2014, ACM, 6 pg.

Shamma, D.A. et al., "Watch What I Wwatch: Using Community Activity to Understand Content," In Proc. of the Int'l. Workshop on Multimedia Information Retrieval, pp. 275-284, ACM, Sep. 23-28, 2007.

Singh, V.K. et al., "Reliving on Demand: a Total Viewer Experience," In Proc. of 19th ACM Int'l. Conf. on Multimedia, Nov. 28-Dec. 1, 2011, ACM, 10 pg.

Sinha, P. et al., "Personal Photo Album Summarization," In Proc. of the 17th ACM Int'l. Conf. on Multimedia, Jan. 2009, ACM, 2pg.

Su, K. et al., "Making a Scene: Alignment of Complete Sets of Clips Based on Pairwise Audio Match," In Proc. Of 2nd ACM Int'l. Conf. on Multimedia Retrieval, p. 26, Jun. 5-8, 2012, ACM.

Zsombori, V. et al., "Automatic Generation of Video Narratives From Shared UGC," In Proc. of 22nd ACM Conf.on Hypertext and Hypermedia, pp. 325-334, Jun. 6-9, 2011, ACM.

"Google+ Stories and Movies: Memories Made Easier," [online] Google Oifficial Blog, May 20, 2014, retrieved from the Internet: <https://googleblog.blogspot.com/2014/05/google-stories-and-movies-memories-made.html>, 10 pg.

"A Look Back", [online] Facebook Help Center, Facebook © 2015, retrieved Oct. 30, 2015, retrieved from the Internet: <https://www.facebook.com/help/206982576163229/>, 2 pg.

"Magisto," [online] Wikipedia, the Free Encyclopedia, Oct. 6, 2015, retrieved from the Internet: <https://en.wikipedia.org/wiki/Magisto>, 9 pg.

"Idiary," [online] Massachusetts Institute of Technology, MIT Computer Science and Artificial Intelligence Laboratory, retrieved Oct. 30, 2015, retrieved from the Internet: <https://www.csail.mit.edu/node/1903>, 1 pg.

Feldman, D. et al., "idiary: From GPS Signals to a Text-Searchable Diary," In Proc. of 11th ACM Conf. on Embedded Networked Sensor Systems (SenSys '13), Art. 6, ACM, 2013, 12 pg.

* cited by examiner

SEMANTIC ENRICHMENT OF TRAJECTORY DATA

CROSS-REFERENCE TO RELATED APPLICATIONS

This application claims the benefit of U.S. Application No. 62/090,330 filed on Dec. 10, 2014, which is fully incorporated herein by reference.

TECHNICAL FIELD

This disclosure relates to semantic processing and enrichment of trajectory data.

BACKGROUND

Technology has evolved to a point where mobile devices are capable of recording a significant amount of content relating to a user's activities over time. Mobile devices often include sensors that may record data as a user goes about his or her day. The mobile device may record data automatically or responsive to a user request to do so. For example, a device such as a modern smart phone may record particular locations visited and the time of visitation, images, and video.

In some cases, a user may wish to review or relive certain experiences at a later time. For example, a user may wish to relive or reflect on a pleasant experience such as a recent vacation. Some conventional systems are able to create digital mementos for users automatically using user provided data. One example of a digital memento is a slide show pieced together automatically from user provided images. It is often the case, however, that the resulting digital memento tends to be uninteresting and/or unappealing to the user. Further, conventional systems often require a large amount of user provided data, e.g., images, to automatically generate a digital memento. A large amount of user provided data, however, is not often available which limits the usefulness of conventional systems.

SUMMARY

A method of enhancing user experience through trajectory data enrichment may include determining, using a processor, enrichment data items related to points of presence (POPs) within trajectory data. The enrichment data items may be retrieved from a data source. The method may include determining, using the processor, ranking metrics for the enrichment data items, and ranking, using the processor, the enrichment data items according to the ranking metrics. The method further may include providing one or more ranked enrichment data items, in association with the related POP of the trajectory data, to a device using the processor.

A system may include a processor programmed to initiate executable operations for enhancing user experience through trajectory data enrichment. The executable operations may include determining enrichment data items related to POPs within trajectory data. The enrichment data items may be retrieved from a data source. The executable operations may include determining ranking metrics for the enrichment data items and ranking the enrichment data items according to the ranking metrics. The executable operations may include providing one or more ranked enrichment data items, in association with the related POP of the trajectory data, to a device.

A computer program product may include a computer readable storage medium having program code stored thereon for enhancing user experience through trajectory data enrichment. The program code may be executable by a processor to perform a method. The method may include determining, using a processor, enrichment data items related to POPs within trajectory data. The enrichment data items may be retrieved from a data source. The method may include determining, using the processor, ranking metrics for the enrichment data items, and ranking, using the processor, the enrichment data items according to the ranking metrics. The method further may include providing one or more ranked enrichment data items, in association with the related POP of the trajectory data, to a device using the processor.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 2-1 is a block diagram illustrating operation of the enrichment system and composition system of FIG. 1 according to one example.

FIG. 2-2 is an exemplary portion of a knowledge model.

DETAILED DESCRIPTION

Figure 1:
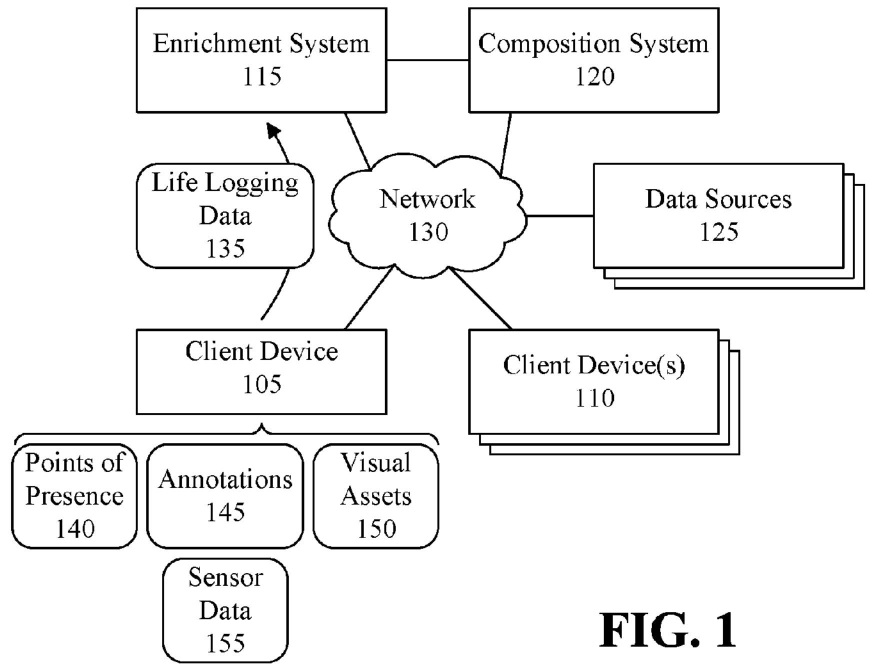
FIG. 1 is a block diagram illustrating an exemplary network system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to semantic processing and enrichment of trajectory data to provide an improved user experience. More particularly, this disclosure relates to obtaining additional data items related to points of presence within the trajectory data. In accordance with the inventive arrangements described within this disclosure, life logging data may be collected by one or more devices of a user. The life logging data may include trajectory data and one or more other items of user generated data such as images, annotations, sensor data, and the like that may be associated with the points of presence of the trajectory data. Items of the life logging data may be semantically processed to determine additional data items called enrichment data or enrichment data items from one or more external data sources. The enrichment data may be ranked. Further, the enrichment data may be stored in association with the points of presence in addition to any other user generated data within a data structure in a computer-readable storage medium.

In one arrangement, the resulting data structure may be processed through one or more composition processes such as summarization and/or further semantic analysis. The resulting data may be used to generate a manifest. The manifest may specify a multimedia composition. The manifest, for example, may specify various items of the life logging data, one or more items of enrichment data, and/or one or more directives that dictate the manner in which the various items specified by the manifest may be played back or rendered as the multimedia composition. Further aspects of the inventive arrangements are described herein in greater detail with reference to the drawings.

The inventive arrangements described herein may be implemented as a method or process of enhancing user experience through trajectory data enrichment performed by one or more data processing systems. In another aspect, the inventive arrangements may be implemented as an apparatus such as a data processing system having a processor. The processor, upon executing program code, may perform one or more operations for enhancing user experience through trajectory data enrichment as described herein. In still another aspect, the inventive arrangements may be implemented as a non-transitory computer-readable storage medium storing program code that, when executed, causes a processor and/or a system to perform and/or initiate the method(s) and/or process(es) described herein.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary network system. The network system may include a client device 105, one or more other client devices 110, an enrichment system 115, a composition system 120, and one or more data sources 125. As pictured, client device 105, client devices 110, enrichment system 115, composition system 120, and data sources 125 may be communicatively linked, e.g., coupled, through a network 130.

Network 130 is the medium used to provide communication links between various devices and data processing systems connected together within the network system of FIG. 1. Network 130 may include connections, such as wire, wireless communication links, or fiber optic cables. Network 130 can be implemented as, or include, any of a variety of different communication technologies such as a WAN, a LAN, a wireless network, a mobile network, a Virtual Private Network (VPN), the Internet, the Public Switched Telephone Network (PSTN), or the like.

Client device 105 may be implemented as any of a variety of wireless electronic devices. Exemplary implementations of client device 105 may include, but are not limited to, communication devices, mobile phones such as "smart phones," tablet computers, wireless enabled portable computers, and the like. Client device 105 may include, or be coupled to, one or more sensors to be described herein in greater detail. Exemplary sensors may include, but are not limited to, cameras, gyroscopes, digital compasses, light detectors, accelerometers, Global Positioning System (GPS) receivers, microphones, biological and/or medical sensors, and the like. Exemplary biological and/or medical sensors may include, but are not limited to, heart rate monitors, body temperature monitors, blood pressure monitors, and the like.

Client devices 110 may be implemented as data processing systems. For example, client devices 110 may be computers such as laptop computers, desktop computers, tablet computers, mobile devices such as mobile phones, or the like. In one aspect, client device 105 and client devices 110 may be utilized by a same user or group of users.

Enrichment system 115 and composition system 120 may be implemented as one or more data processing systems. In one aspect, enrichment system 115 and composition system 120 may be implemented within a same data processing system. In another aspect, each of enrichment system 115 and composition system 120 may be implemented in one or more networked data processing systems. Examples of data processing systems may include computers, servers, and the like. It should be appreciated that enrichment system 115 and/or composition system 120 also may be implemented using one or more virtual servers executing within one or more physical data processing systems.

Data sources 125 may be implemented as one or more Websites, Web-based services, or the like. Data sources 125 may be operated by parties unaffiliated with, and/or external to, enrichment system 115 and/or composition system 120. Data sources 125 may store data and provide the data responsive to received queries.

In one aspect, one or more or all of data sources 125 may be linked open data sources. The term "linked open data" means content such as text, images, audio, video, multimedia, and/or the like that may be linked and that is open or otherwise provided responsive to queries requesting data items meeting criteria specified by the queries. Linked open data is structured data in which related data items may be connected or linked. Linked open data is typically made available using technologies such as Universal Resource Identifiers (URIs) to specify entities or concepts, Hypertext Transfer Protocol (HTTP) to retrieve resources and/or descriptions of resources, and Resource Description Framework (RDF) which is a generic graph-based data model that may be used to structure and link data.

RDF specifies a generic graph-based data model for describing objects, including the object's relationships with other objects. RDF extends the linking structure of the Web to use URIs to name the relationship between things as well as the two ends of the link (usually referred to as a “triple”). RDF allows structured and semi-structured data to be mixed, exposed, and shared across different applications. RDF may use several different serialization, e.g., file, formats such as RDF/XML, Notation-3 (N3), Turtle, N-Triples, RDFa, and RDF/JSON.

Examples of datasets on Linked Open Data may include, but are not limited to DBpedia (structured information extracted from sources such as Wikipedia), Freebase (database/service of well-known things such as people, places, and/or things), Wunderground.com® (weather reporting services), GeoNames (geographical names database/service), etc. Other exemplary datasets that may not be on Lined Open Data may include Flickr® (photo/image database/service) and Wikipedia. It should be appreciated that the inventive arrangements described within this disclosure are not intended to be limited to the particular exemplary information sources provided.

In one exemplary method of operation, client device 105 and/or one or more of client devices 110 may execute a life logging application that collects and stores life logging data 135 over time. Life logging data 135 may include trajectory data. Trajectory data is a set of one or more points of presence (POPs) 140. POPs 140 may be determined using a GPS receiver of client device 105. A POP is a geographical point or location visited by a user, or a device of the user such as client device 105, at a given time. A POP specifies, or includes, a geographical coordinate and a time. In one aspect, each geographical coordinate may be specified as latitude and a longitude. In another aspect, each geographical coordinate may be specified as latitude, a longitude, and an altitude. In one aspect, the life logging application may separate POPs into relevant and non-relevant POPs. The life logging application may collect one or more POPs as trajectory data. The trajectory data may be automatically selected or designated by a user of the life logging application.

Life logging data 135 may include additional information such as one or more annotations 145 entered at a POP, and/or one or more visual assets 150 such as images and/or video captured at a POP. An annotation is a user comment entered at a POP as a text entry or a speech entry that may be converted to text. In any case, annotations are associated with the particular POP at which the annotations are captured or created. Similarly, visual assets 150 may be captured by the user through client device 105 and associated with the particular POP at which the visual assets 150 are captured.

Client device 105, in executing the life logging application, may allow a user to store a title (not shown) in association with one or more POPs as part of life logging data 135. A user further may specify a user picture or other user identifier (not shown) as part of life logging data 135. In still another arrangement, any sensor data 155 collected by sensors of client device 105 in executing the life logging application at or near, e.g., within a predetermined distance of and/or within a predetermined amount of time before and/or after, a POP may be stored in association with the POP as part of life logging data 135.

Life logging data 135 may include sensor data 155. Sensor data 155 may include, but is not limited to, accelerometer data, gyroscopic data, biomedical data, the particular networks to which a device is communicatively linked or otherwise coupled, applications that may be used or executed by the device, and the like. Biomedical data may include data such as heart rate, blood pressure, steps taken in a predetermined amount of time, and the like.

It should be appreciated that while a user may associate one or more additional data items with POPs 140, a user may also choose not to associate one or more or all of the aforementioned data items of one type or another with one or more of POPs 140. For purposes of discussion, each item of life logging data 135, e.g., POPs 140, annotations 145, visual assets 150, titles, user identifiers, and/or sensor data 155 may be considered user generated data (UGD). UGD, for purposes of this disclosure, is to be distinguished from enrichment data or enrichment data items, which are determined by enrichment system 115 through semantic analysis of the UGD and obtained from data sources 125. UGD, for example, is generated within and/or by client device 105.

For example, a user may utilize a life logging application executing on client device 105 while on vacation to generate life logging data 135. The user may add annotations 145, visual assets 150, titles, a user identifier, and/or other sensor data 155 to life logging data 135 while on vacation over the course of several days. Client device 105 may upload life logging data 135 to enrichment system 115. It should be appreciated that life logging data for the user may be collected by one or more other ones of client devices 110 and uploaded to enrichment system 115.

Enrichment system 115 may semantically analyze and/or process life logging data 135. In general, enrichment system 115 may identify semantic pointers within life logging data 135 and, using the semantic pointers, formulate queries to submit to data sources 125 for enrichment data. Enrichment system 115 may receive and process enrichment data obtained from data sources 125 and store the enrichment data in association with life logging data 135. For example, enrichment data items may be stored in association with particular POPs of life logging data 135. Enrichment data items may be ranked or otherwise sorted with the sorting stored.

In another aspect, enrichment system 115 may generate elements such as a subtitles, locality names, and/or connective messages as part of the enrichment data. Enrichment system 115 further may obtain enrichment data from data sources 125 such as related visual assets, one or more associated music items, weather reports, facts, landmarks, and the like.

In one arrangement, enrichment system 115 may build a knowledge model that may be stored in a computer readable storage medium. The knowledge model may include both life logging data 135 (e.g., UGD), enrichment data, and/or any determined sorting of the enrichment data items. In general, the knowledge model is a systematic approach, implemented as a data structure stored in memory, which describes relations between UGD and external data, e.g., enrichment data.

Composition system 120 may process the knowledge model to perform composition. Composition system 120 may generate a manifest. The manifest may include one or more items of life logging data 135, one or more items of enrichment data, and one or more directives. In one arrangement, the manifest specifies a multimedia composition. The directives instruct a playback device how to play back the items of life logging data 135 and/or the enrichment data items to create a multimedia composition. A multimedia composition is a collection of one or more multimedia items organized collectively as a presentation for consumption by a user. Within the presentation that is generated by the playback device, and in accordance with the directives, scenes may be formed of items of life logging data 135 and/or enrichment data linked using the connective messages.

For example, a presentation may include visual assets, text, audio, and the like. A presentation may be a sequence of one or more pages, e.g., Web pages, presented sequentially over time. The pages may be aggregated in scenes. A page may include one or more multimedia items. Examples of presentations may include, but are not limited to, a linear movie, an interactive movie, an interactive photo album, and a presentation using one or more Web pages, or the like. It should be appreciated, however, that the multimedia composition may be rendered or generated locally by the playback device through execution of the manifest.

It should be appreciated that while composition system 120 is illustrated in FIG. 1 as a network based data processing system, e.g., a server, implementation of composition system 120 is not so limited. For example, composition system 120 may be implemented within client devices 105, client devices 110, and/or implemented within another third party system such as a server and provided to client devices as a service. In this regard, the manifest may serve as an exchange format between an intelligent composer that creates the manifest and the system that creates the composition from the manifest, e.g., plays back the manifest.

FIG. 1 is provided for purposes of illustration only. It should be appreciated that client devices 110 may include hardware and/or software similar to that described for client device 105. As such, in some cases, in addition to the features attributed to client device 105, client devices 110 may also function and/or operate similar to, or the same as, client devices 110 to collect life logging data for the user and upload the life logging data to enrichment system 115.

Figures 1, 2:
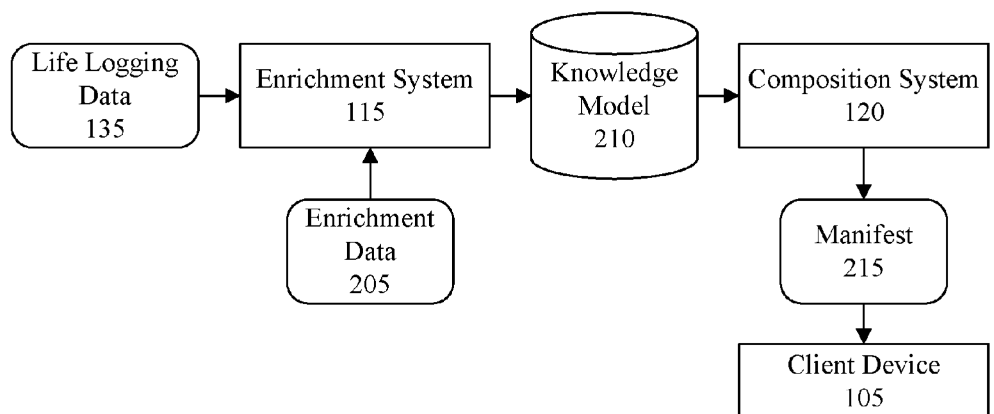
Figure 2:
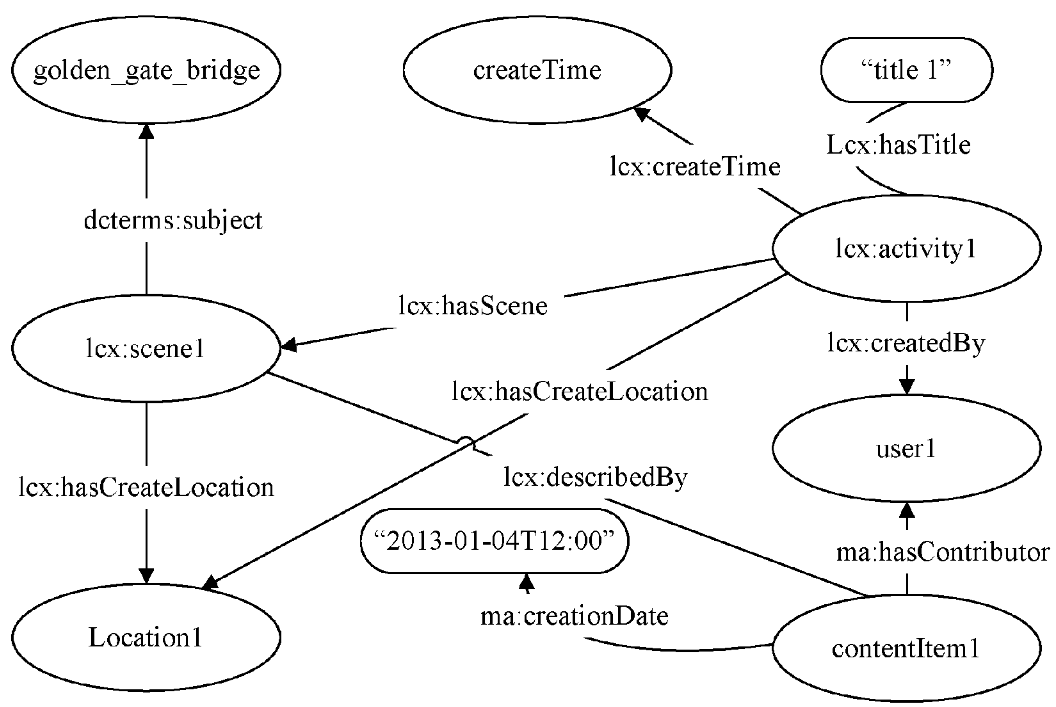

FIG. 2-1 is a block diagram illustrating operation of enrichment system 115 and composition system 120 according to one example. As pictured, enrichment system 115 may receive life logging data 135. Enrichment system 115 may semantically process life logging data 135 and, responsive thereto, formulate one or more queries that may be submitted to data sources 125. Semantic processing refers to computer-based understanding of the meaning of natural language and/or other terms to perform computer-based operations such as facilitating sharing of knowledge bases, enabling semantic searching of data, and/or deriving facts that are not expressed explicitly in an ontology and/or knowledge base.

Responsive to the queries, enrichment system 115 may receive enrichment data 205. Enrichment system 115 may store the life logging data 135 and/or enrichment data 205 within a data structure in a computer readable storage medium. The data structure may be referred to as a knowledge model 210. In one arrangement, the enrichment system may be considered a filter or processor for "big data" sources. Given all the related information for a POP, enrichment system 115 may extract relevant information using the various ranking systems and/or techniques described herein. Enrichment system 115, however, may also discard information considered non-relevant.

In one aspect, knowledge model 210 may be implemented as a database. In another aspect, knowledge model 210 may be implemented as a triple database. Knowledge model 210 may be organized according to one or more ontologies maintained within enrichment system 115. In one aspect, knowledge model 210 may utilize one or more ontologies or parts of ontologies including, but not limited to, Linking Open Descriptions of Events (LODE), ontologies provided by the Open Annotation Community (OAC), Friend-Of-A-Friend (FOAF) ontology, Simple Knowledge Organization System (SKOS), and the like. For example, POPs and the associated data items, whether UGD items and/or enrichment data items, may be stored in association with a node of the ontology defining knowledge model 210. POPs, for example, may be mapped to nodes of the ontology. Any UGD items and/or enrichment data items may be associated with nodes of the ontology by virtue of their association with a POP.

Composition system 120 may access knowledge model 210 and apply one or more composition processes such as summarization and/or further semantic processing. Composition system 120 may generate manifest 215. Manifest 215 may be provided to one or more client devices such as client device 105 for rendering and/or playback using appropriate playback software executing therein.

In another aspect, composition system 120 may reduce the enriched information. The enrichment process may generate many knowledge links and assets associated with the knowledge links such as pictures, text, dates, etc. as described in further detail with reference to FIG. 2-2. The process of reducing the amount of enriched information can be customized to particular composition types. For example, in a system that generates short video clips, the composition system may only use top ranked enrichment data. In another example, composition system 120 may not have practical space limitations and use other metrics and/or requirements such as topics (e.g., trip reports, documentaries, event reliving, etc.) to remove items. Composition system 120 may use different strategies to select the knowledge items from knowledge model 120 for use and/or removal.

FIG. 2-2 is an exemplary portion of a knowledge model. FIG. 2-2, for example, may represent a portion of knowledge model 210 of FIG. 2-1. More particularly, FIG. 2-2 illustrates a knowledge model that incorporates heterogeneous knowledge sources such as ontologies and builds a graph as an interlinked structure pictured in FIG. 2-2. The knowledge model may be used to aggregate knowledge derived from external data sources, e.g., enrichment data, with UGD. The knowledge model, as previously described, may use partial or complete industry standard ontologies. For example, the FOAF is an ontology that describes social relations that may be incorporated and applied to same entity names and relation names.

The graph implementation of knowledge model 210 maybe designed to specifically describe user activities. For example, trips are one type of user activity that may be described. Trip activities, as described in the graph, may be used as a means to describe all related information about a user's trip including, but not limited to, visited locations, weather information, important nearby landmarks, historic facts, etc. The knowledge model, as implemented by the graph, may include other types of human activities like important events (birthdays, weddings), attending sport events, etc. The graph further may include temporal information like planning an activity, during the activity, and after the activity. Another characteristic may be that knowledge model 210 creates relations between user activity information and media/content that the same user (or other users) captured while performing these activities.

For example, responsive to enrichment system 115 determining that some external knowledge base describes a connection between user X and user Y using FOAF, the information may be incorporated into the knowledge model since FOAF is used for these types of descriptions. The information describing a connection between user X and Y may be inserted into the graph or kept in external databases that may be queried directly by the systems described herein.

In the example described with reference to FIG. 2-2 and used within this disclosure, the knowledge model may be directed to the description of user stories and/or experiences. For example, DBpedia describes landmarks, enrichment system 115 may use an ontology that describes the relation of landmarks to a user's story. Examples of relations that may be used in the knowledge model may include, but are not limited to, landmark visited by the user, landmark close to the user trajectory that the user may or may not have visited, landmarks that the user plans to visit, landmarks recommended by friends to the user, etc.

An external data point known as "Golden Gate Bridge" may not be attributed to the user. When this external data item is inserted into knowledge model 210, the node "golden_gate_bridge" may have attributes related to the user. For example, if the user had a 2 hour trip to the bridge, this information may be defined in the knowledge model. FIG. 2-2 illustrates that mapping may be used to create a knowledge infrastructure about a user's activity. DBpedia knows about landmarks, for example, but knowledge model 210 may be used to establish how the landmark, in this case the Golden Gate Bridge, relates to a user's activities such as trips, a daily commute, and also to user events like weddings, birthdays, etc.

Figures 3, 4:
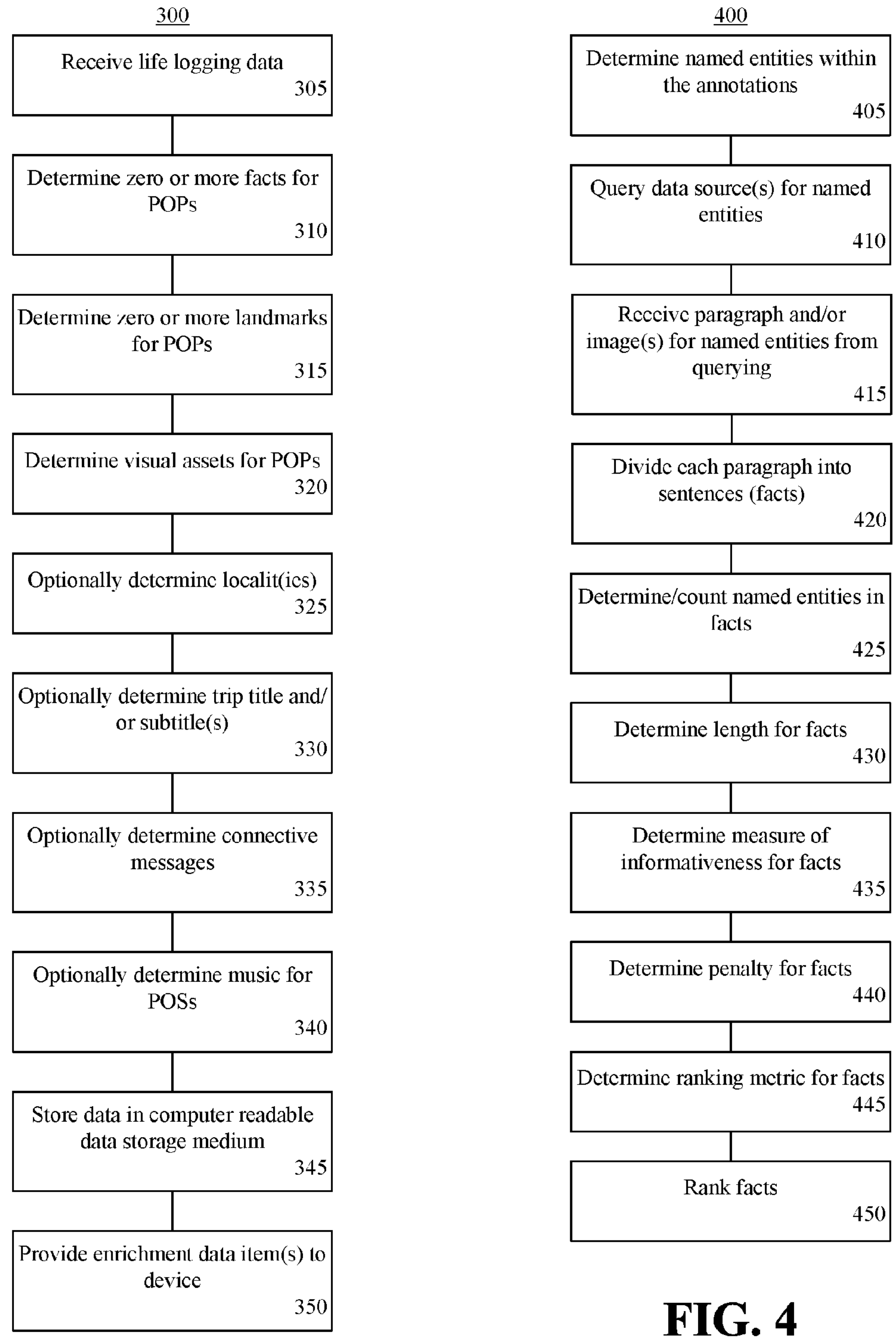
FIG. 3 is a flow chart illustrating an exemplary method of semantic enrichment.
FIG. 4 is a flow chart illustrating another exemplary method of semantic enrichment.

FIG. 3 is a flow chart illustrating an exemplary method 300 of semantic enrichment. Method 300 illustrates exemplary processing that may be performed on received life logging data as implemented by enrichment system 115 of FIGS. 1 and 2.

In block 305, the enrichment system may receive life logging data for a user. The life logging data may be received from one or more devices utilized by the user. For example, the life logging data may be received by client device 105 and/or one or more of client devices 110.

In block 310, the enrichment system may determine zero or more facts for the POPs of the trajectory data. For example, for each POP, the enrichment system may determine zero or more facts. In one aspect, the facts may be ranked according to a ranking metric. In block 315, the enrichment system may determine zero or more landmarks for POPs of the trajectory data. For example, for each POP, the enrichment system may determine zero or more landmarks. In one aspect, the landmarks may be ranked according to a ranking metric. In block 320, the enrichment system may determine one or more visual assets for POPs of the trajectory data. The term "visual asset," as defined within this disclosure, means an image or video in digital form. In one aspect, the visual assets may be ranked according to a ranking metric. It should be appreciated that the various items of enrichment data may be ranked using a ranking metric that is unique to the particular type of enrichment data item determined. Further, enrichment data items may be ranked across a plurality or all POPs or ranked on a per-POP basis.

In block 325, the enrichment system may optionally determine a locality for one or more, e.g., a collection including one or more, POPs. In one aspect, for example, the system may use a geographical naming service such as GeoNames and query the service for names of POPs using the location of the POPs. Those POPs having a same name, may be grouped into a locality or otherwise associated with one another as a town, a city, a county, a region, a geological region of interest (e.g., a lake or mountain range), a state, or the like.

In block 330, the enrichment system may optionally determine a trip title and/or one or more subtitle(s). In one example, the trip title and/or subtitle(s) may be explicitly indicated by the user within the life logging data. In another example, the trip title and/or subtitle(s) may be determined from an analysis of any annotations of the life logging data.

In block 335, the enrichment system may optionally determine a connective message for each pair of consecutive POPs of the life logging data. In one aspect, the enrichment system may determine differences in temporal, spatial, or other properties of the POPs between two consecutive POPs and generate sentences describing the differences. For example, the enrichment system may determine the amount of time needed to travel from a first POP to a second, next POP, determine the distance between the first POP and the second POP, etc. The enrichment system may create a sentence such as "One hour later and 40 miles outside of <location A>" where location A is the first POP or a geographical name determined from the first POP and one hour is the time differential between the first POP and the second POP.

In another aspect, the enrichment system may be dedicated to building knowledge about user trajectories. In that case, the connective messages may be generated by the enrichment system using information described in the system's knowledge model. The connective messages may become part of the knowledge model. In another aspect, the knowledge model and enrichment process may serve as an overall representation of knowledge for user activities and events. Accordingly, the connective messages may be generated by the composition system. The composition system may be devoted to generating user stories. In that case, connective messages may be related to user stories more so than user activities and events.

In block 340, the enrichment system may determine music for one or more or a subset of POPs. The music may be used as background music for the multimedia composition and stored in association with the subset of POPs. In this manner, the enrichment system may map the POPs, i.e., the subset of POPs, to the determined music. For example, the music selection process of block 340 may use knowledge aggregated by the enrichment system to perform intelligent selection of relevant music. The enrichment system may associate music from a pool of music items with a particular story. In one aspect, the enrichment system may select music based upon the locality/location of the story. In another aspect, the enrichment system may analyze text, extract sentiment from the text, and associate music with the sentiments. A sentiment generally refers to a view or attitude, e.g., an opinion, toward a situation or event. The sentiment may be determined through semantic processing as described herein.

In block 345, the enrichment system may store the data determined in method 300 in a data structure within a computer readable storage medium for subsequent use. For example, the system may store the data determined in method 300 in knowledge model 210. The data may be stored in a format that may be queried or at least partially queried using database queries, request-response protocols, notification protocols, and/or transfer formats such as text, JSON, XML, or other proprietary formats.

In block 350, the enrichment system may provide one or more enrichment data items to a device. For example, the enrichment system may provide one or more of the facts, one or more of the landmarks, and/or one or more of the visual assets. As noted, the enrichment data items may be ranked. The enrichment data item(s) may be provided in association and/or in combination with one or more items of the life logging data. For example, one or more points of POPs may be provided to a user in combination with one or more enrichment data items determined for, and associated with, the POPs. One or more other data items of the life logging data may also be provided in association with the POPs and/or the enrichment data item(s). By providing and/or combining the enrichment data items as described, an improved user experience is provided to a user of the device in that the range of information relating to the user's activities, as documented by the life logging data, is enhanced. The enrichment data items, for example, may provide supplemental information and/or serve as connective content between items of the life logging data such as POPs that may be viewed. In one aspect, the enrichment data items may be provided to a device for the purpose of composing a visual representation, e.g., a movie, of a user's trip and/or experience.

FIG. 4 is a flow chart illustrating another exemplary method 400 of semantic enrichment. More particularly, method 400 illustrates an exemplary implementation of block 310 of FIG. 3. As discussed, POPs of the life logging data may be associated with one or more annotations. Accordingly, each annotation is associated with a POP of the life logging data for the user.

In block 405, the enrichment system may determine named entities located in the annotations. The enrichment system may search for named entities within the annotations. For example, the enrichment system may perform a process called named-entity recognition or named-entity identification. In one aspect, the annotations may be stored collectively and searched. In another aspect, the enrichment system may search the POPs and select each POP associated with an annotation or annotations and search the annotations for the selected POPs.

Named-entity recognition is an information extraction procedure that identifies text elements such as names of persons, organizations, locations, expressions of time, quantities, monetary values, percentages, and the like. In one aspect, the enrichment system may utilize or access a list of named entities for one or more of the data sources that may be queried. The enrichment system may identify or locate named entities, as defined by the one or more data sources to be queried, that exist in the annotations. As an illustrative example, the enrichment system may utilize a system called "DBpedia Spotlight." DBpedia Spotlight is a named-entity recognition system that utilizes DBpedia. Spotlight may be used to locate named entities from DBpedia from within the annotations. It should be appreciated, however, that any of a variety of named-entity recognition technologies may be used to locate named entities within the annotations.

In block 410, the enrichment system may query one or more of the data sources for the named entities located or found within the annotations. For example, the enrichment system may generate one or more queries for the data sources that specify the named entities found in the annotations. Depending upon the particular application programming interface (API) of the data sources, a query may specify one or more named entities. The enrichment system may send the queries to the data sources. In one exemplary implementation, the enrichment system may query DBpedia using the named entities.

In block 415, the enrichment system may receive a response for each query and/or named entity. For example, for each named entity, the enrichment system may receive descriptive text referred to herein as a paragraph responsive to the query. The paragraph may describe the named entity.

In another aspect, for each named entity, the enrichment system may also receive an image from the data source(s) responsive to the query.

In yet another aspect, the enrichment system may extract data from the images for insertion into the knowledge model. The enrichment system may process images to detect faces. If faces are detected, the images may be rejected. In another example, the images may be processed using a technique called "object recognition." Using object recognition, the enrichment system may detect particular objects considered important such as cars, dogs, cats, buildings, trees and the like. In this way the accumulated knowledge for the images may increase and the enrichment system can make better decisions about whether to include an image in the story.

In block 420, the enrichment system may divide the paragraphs into sentences. For purposes of discussion, each sentence of a paragraph retrieved for a named entity may be referred to as a fact. For each paragraph received for a named entity, the enrichment system may divide the paragraph into sentences or facts. The enrichment system may rank the facts. In one arrangement, the enrichment system may rank the facts across all POPs. In another arrangement, the enrichment system may rank the facts on a per POP basis.

Blocks 425-445 describe an exemplary technique for ranking the facts. It should be appreciated, however, that other methods of ranking the facts may be used. In block 425, the enrichment system may determine the named entities in the facts. The enrichment system, for example, may determine the named entities in each fact. The enrichment system may determine the named entities in each fact as described above with reference to processing annotations. Further, the enrichment system may count the number of named entities found in each fact. In block 430, the enrichment system may determine the length for the facts. The enrichment system, for example, may determine the length of each fact by counting the number of words in the fact, where the number of words is the length.

In block 435, the enrichment system may calculate a measure of informativeness ($I_S$) for facts. The enrichment system may calculate a measure of informativeness for each fact. The measure of informativeness may be calculated as $$I_S = \frac{E_S}{L_S},$$

where $E_S$ is the number of named entities found in a fact and $L_S$ is the length of the fact.

In block 440, the enrichment system may determine a penalty $P_S$ for the facts. The enrichment system may determine a penalty for each fact. The penalty for a given fact depends upon the length of the fact. The penalty may be calculated as $$P_S = \left|\frac{\mu - L_S}{\mu}\right|$$

when min$<L_S<$max, where min and max are the minimum and maximum tolerable fact lengths, respectively, for a particular type of system. In this regard, min and max may be set as preferences within the system for fact lengths. In one aspect, the values of min and max may take into account screen size and duration of facts displayed on a screen when multimedia compositions are generated and/or played. For purposes of illustration, the values of min and max may be min=40 and max=100. When the condition min<$L_S$<max is not met, then $$P_S = \left|\frac{\mu - L_S}{\mu^d}\right|.$$

With the expressions for $P_S$, the values of d and μ may be calculated as $$d = \frac{|L_S - \max|}{(\max - \min)} \text{ and } \mu = \frac{\min + \max}{2}.$$

In block 445, the enrichment system may determine a ranking metric for the facts. The ranking metric may be a cost. The enrichment system may use a cost expression to calculate the cost for each fact. The cost expression may reward informativeness $I_S$, while applying a penalty $P_S$ that depends upon fact length. In one arrangement, cost $C_S$ may be calculated as $C_S = I_S + P_S$. In block 450, the enrichment system may rank the facts. The enrichment system may rank, or sort, the facts according to the cost calculated using the cost expression. Facts may be ranked across all POPs, on a per POP basis, or both.

It should be appreciated that using method 400, for any given POP, zero or more facts may be determined. For example, a POP without any associated annotation may not be processed for fact determination. In another example, a POP may be associated with one or more annotations that do not include any named entities, which results in zero facts for the POP despite being processed through method 400.

Figure 5:
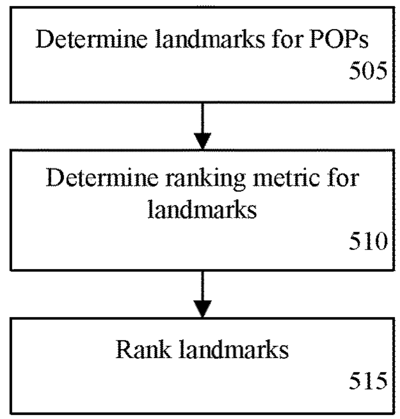
FIG. 5 is a flow chart illustrating another exemplary method of semantic enrichment.

FIG. 5 is a flow chart illustrating another exemplary method 500 of semantic enrichment. More particularly, method 500 illustrates an exemplary implementation of block 315 of FIG. 3. In one aspect, a landmark may be any relevant facility, monument, or icon in a vicinity of a POP. Given a trajectory defined by a plurality of POPs of the life logging data, the enrichment system may detect relevant landmarks.

In block 505, the enrichment system may determine landmarks for the POPs. For example, for each POP, the enrichment system may query a geographical names data source such as GeoNames, to determine any landmarks within a predetermined distance of the POP using the latitude and longitude of the POP to specify or define location. In one aspect, the predetermined distance may be a circle having a radius of r, where r may be a preference that may be set for the enrichment system. The enrichment system may receive query results from the data source(s). The query results may include zero or more landmarks. For each landmark returned, the query results may specify a name, descriptive text, latitude and/or longitude, and/or a URL (e.g., a Wikipedia URL or URL for the landmark itself). In one example, the query results for each landmark may also include a measure of popularity.

In block 510, the enrichment system may determine ranking metrics for the landmarks. The ranking metric may be a cost of a landmark. The enrichment system may calculate a cost $C_L$ for each landmark. In one aspect, the cost of a landmark may depend upon the measure of popularity p for the landmark and the distance d of the landmark to a POP of the life logging data. The enrichment system may determine that a landmark is of higher relevancy than other landmarks when the landmark has a higher popularity and shorter distance. Thus, in one arrangement, the cost $C_L$ may reward popularity and penalize distance.

In one example, the cost $C_L$ may be expressed as $$C_L = \alpha\frac{p}{p_{max}} + (1-\alpha)\frac{R-d}{R},$$

where α is a system preference specifying a trade-off ratio between popularity and distance, $p_{max}$ is the maximum popularity value among candidate or determined landmarks and acts as a normalization factor, and p is the measure of popularity. In one aspect, p may be the measure of popularity returned from the data source queried. In another aspect, p may be a count of page views over a predetermined period of time for the landmark as determined from a designated Web page such as the Web page of the landmark itself, a Wikipedia page for the landmark, or the like.

In block 515, the enrichment system may rank the landmarks. The enrichment system may rank, or sort, the landmarks according to the cost calculated using the cost expression. Landmarks may be ranked across all POPs, on a per POP basis, or both. It should be appreciated that using method 500, for any given POP, zero or more landmarks may be determined. For example, there may not be any landmarks within the predetermined distance of one or more POPs of the life tracking data.

Figure 6:
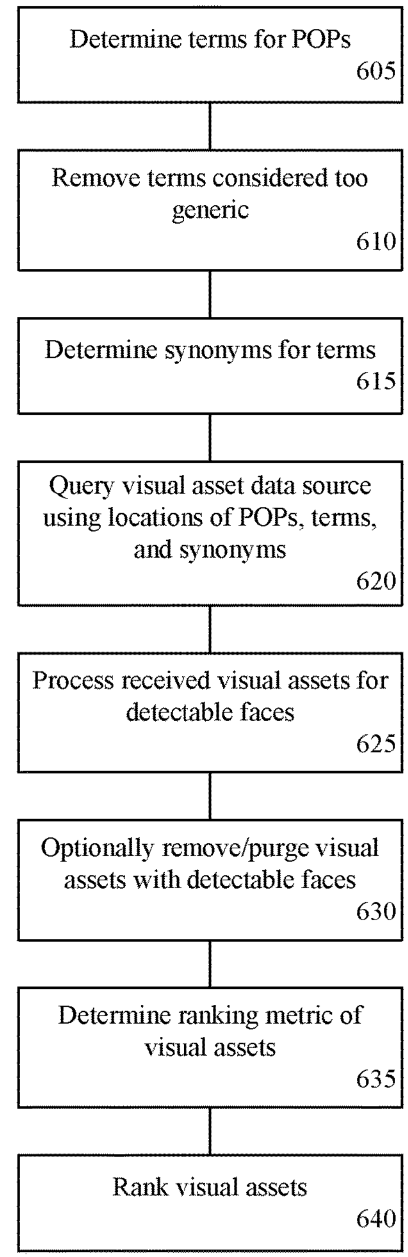
FIG. 6 is a flow chart illustrating another exemplary method of semantic enrichment.

FIG. 6 is a flow chart illustrating another exemplary method 600 of semantic enrichment. Method 600 illustrates an exemplary implementation of block 320 of FIG. 3. Method 600 utilizes semantic keyword generation to determine visual assets that may be related to POPs of the life logging data.

In block 605, the enrichment system may determine terms for the POPs. In one aspect, the system may query a geographical naming data source, e.g., GeoNames, to obtain terms for the POPs. For example, the enrichment system may use the location of a POP and query the geographical naming data source. The enrichment system may receive zero or more terms for the POP that may be referred to as a "set" of terms. The terms describe attributes of the POP. In some cases, the terms may be called feature codes. After performing block 605, each POP may be associated with a set of zero or more terms.

In block 610, the enrichment system may remove terms considered too generic. For each set of terms, for example, the enrichment system may remove those terms considered to be too generic. The enrichment system may maintain or store a list of generic terms. The enrichment system may search the terms in each set for each POP, for example, and remove or delete those terms from the set(s) that are on the list of generic terms.

In block 615, the enrichment system may determine synonyms for terms in the set. In one aspect, the enrichment system may, for each term remaining in each set, query a synonym data source to obtain zero or more terms considered to be synonyms of the term specified in the query. In block 620, the enrichment system may query a visual asset data source. In one aspect, the system may generate one or more queries for the POPs. In one example, each query generated by the enrichment system may specify a location of a POP, the terms of the set of terms for the POP as determined after block 610, and any synonyms of the terms in the set of terms. The enrichment system may submit the queries to the visual asset data source.

In block 625, the enrichment system may process visual assets received responsive to the querying. In one aspect, the enrichment system may process the received visual assets to determine whether each visual asset includes a detectable face. The enrichment system, for example, does not attempt to identify any particular face, but rather the presence of any face (e.g., a face of a human being). In block 630, the enrichment system may optionally remove or purge each visual asset received from the visual asset data source that includes a detectable face. For example, the enrichment system may exclude images with detectable faces since the images may be used to construct a story of a user trip. The images collected from external data sources, for example, may include faces of people unrelated to the user, which may be excluded.

In other cases, however, faces may be appropriate. For example, in the case where a user visits the Golden Gate Bridge, the enrichment system may compose a story that conveys the notion of how people from all over the world usually visit this landmark. In this example, the enrichment system may not exclude images with detectable faces. In another example, where a user and his family visit New York, pictures from social networks (e.g., external sources) taken by the user's family while in New York may be desirable. In these situations, images with detectable faces may not be excluded. In one aspect, whether images with detectable faces are excluded may be a user adjustable setting.

In block 635, the system may determine a ranking metric for the visual assets. The ranking metric may be a measure of relevance for the visual assets. For example, the system may determine a measure of relevance for each visual asset. In some cases, the visual asset data store may provide a metric in association with each visual asset that is provided. The metric may be used by the system as a measure of relevance for the visual asset. A service such as Flickr, for example, may provide an interestingness score that the enrichment system may use as the measure of relevance.

In block 640, the enrichment system may rank the visual assets. The enrichment system may rank, or sort, the visual assets according to the measure of relevance. Visual assets may be ranked across all POPs, ranked on a per POP basis, or both. It should be appreciated that using method 600, for any given POP, zero or more visual assets may be determined. For example, there may not be any visual assets available for a given location of a POP or within a predetermined distance of the location of the POP.

Example 1 presents exemplary pseudocode illustrating another aspect of method 600 for obtaining visual asset type enrichment data. Within Example 1, the list of generic terms is referred to as the "Stoplist". Further, terms are referred to as codes and/or feature codes.

EXAMPLE 1

```
for each POP_i in the LifeLoggingData
    FeatureCodes = GetGeoNamesFeatureCodes(latitutde_i, longitude_i)
    FeatureCodes = RemoveTrivialCodes(FeatureCodes, Stoplist)
    for each Code in FeatureCodes
        Synonyms[Code] = FindWordNetSynonyms(Code)
    end for
    Query = CreateFlickrQuery(latitude_i, longitude_i, FeatureCodes,
    Synonyms)
    (ImageList, InteringnessList) = RunFlickrQuery(Query,
        numberImages=10,
        rankType=interestingness)
```

-continued

```
    for each Image in ImageList
        rank = InterestingnessList[Image]
        if FaceDetect(Image) == FALSE
            SaveTripleDB(POP_i, Image, rank)
        end if
    end for
end for
```

Figure 7:
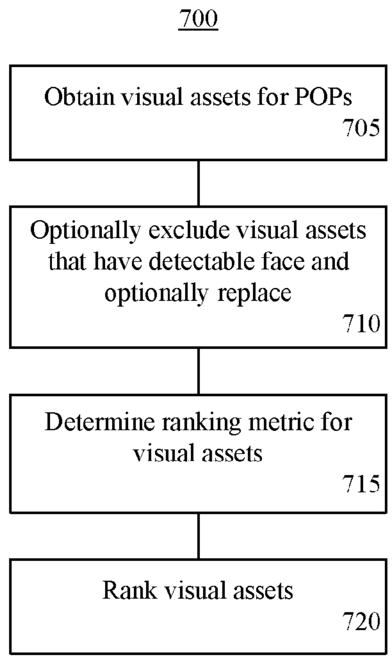
FIG. 7 is a flow chart illustrating another exemplary method of semantic enrichment.

FIG. 7 is a flow chart illustrating another exemplary method 700 of semantic enrichment. Method 700 illustrates another exemplary implementation of block 320 of FIG. 3. Method 700 utilizes social text mining to determine visual assets that may be related to POPs of the life logging data. In one aspect, method 700 may utilize descriptions and tags for visual assets entered by users of social networking systems to determine visual assets that relate to POPs of the life logging data.

In block 705, the enrichment system may obtain visual assets for the POPs. The system may request visual assets for POPs from one or more visual asset data stores. The system may request a predetermined number of visual assets, e.g., a set of "N" visual assets where N is an integer value, for each POP. In the exemplary pseudocode of Example 2 below, N is set equal to 200. It should be appreciated that the particular number of visual assets requested for each POP may be increased or decreased. The value of N may be specified as a system setting. For example, the number may be specified as a system setting. In illustration, for each POP, the system may request N visual assets for the latitude and longitude of the POP.

The enrichment system may receive the visual assets in response to the request(s). In addition, the enrichment system may receive tags and/or other descriptive data for the visual assets that are received. In one aspect, the visual asset data store may be a social networking system. As defined within this disclosure, the term "social networking system" means a platform such as a Website to build social networks and/or social relationships among users that share similar interests, activities, backgrounds, and/or real-life connections. In one aspect, a social networking system may include a user profile or other representation of a user, the user's social links, and/or other digital assets such as visual assets posted or otherwise made available by the user.

In block 710, the enrichment system may determine those visual assets that have detectable faces. The enrichment system may optionally exclude the visual asset and associated descriptive data for each visual asset determined to have a detectable face from the set of visual assets obtained for each POP. In one aspect, each visual asset excluded due to detection of a face therein may be replaced by another visual asset with no detectable face. For example, the enrichment system may query for a number of additional visual assets and associated descriptions that is equal to the amount purged as having detectable faces. The enrichment system may continue requesting and purging, for example, until the desired number of visual assets is obtained. Visual assets that include detectable faces may be excluded or not as previously described depending upon the context and/or story that may be created. In one aspect, whether images with detectable faces are excluded may be a user adjustable setting.

In block 715, the enrichment system may determine a ranking measure for the visual assets. In one example, the ranking metric may be a measure of relevance of the visual assets to the POPs. In one aspect, the enrichment system may determine relevance of the visual asset according to relevance of terms obtained from the descriptive data for the visual asset. For example, the enrichment system may use a term vector space to describe the relation between visual assets and the terms associated with the visual asset. Each unique term may define a dimension. Term relevance, for example, may be calculated using a metric known as term-frequency inverse document frequency (TF-IDF). TF-IDF is a numerical statistic intended to reflect importance of a word within a document or corpus of text. In general, TF-IDF rewards uniqueness of a term within a corpus of text over popularity of the term. In one aspect, the measure of relevance of a visual asset may be the sum of relevance measures (TF-IDFs) of terms from the description of the visual asset.

Non-dictionary terms may become popular on social networking systems, in processing the terms for relevance, any term composed of alphanumeric digits, symbols, and the like may be processed as opposed to only those terms found within a dictionary. A clustering technique, e.g., "k-means clustering," may be used to process the terms, including non-dictionary terms. Accordingly, tags such as "sanfran" may be processed despite not being a more proper or correct term such as "San Francisco". The term "saturdate" may be processed despite not being "date on Saturday" as a further example.

In block 720, the enrichment system may rank the visual assets. The enrichment system may rank, or sort, the visual assets according to relevance. Visual assets may be ranked across all POPs, ranked on a per POP basis, or both. It should be appreciated that using method 700, for any given POP, zero or more visual assets may be determined. For example, there may not be any visual assets available for a given location of a POP or within a predetermined distance of the location of a POP.

Example 2 presents exemplary pseudocode illustrating another aspect of method 700 for obtaining visual asset type enrichment data.

EXAMPLE 2

```
for each POP_i in LifeLoggingData
    ImageSet = CallFlickrAPI(latitude_i, longitude_i, numberImages = 200)
    for each Image in ImageSet
        while FaceDetect(Image) == TRUE
            Image = CallFlickrAPI(latitude_i, longitude_i,
            numberImages = 1)
        end while
        Terms= ExtractTermsFromDescAndTags(Image)
        TFIDFmatrix = AddTermsToTFIDFmatrix(Terms)
    end for
    TFIDFmatrix = RemoveTrivialTerms(TFIDFmatrix, Stoplist)
    ClusterSet = kMeansClusteringUsingTFIDF(clusters = 5,
        distanceType = cosineSimilarity)
    BigCluster = FindClusterWithMoreMembers(ClusterSet)
    Centroid = FindClusterCentroid(BigCluster)
    TargetImages = FindTenClosestImages(Centroid)
    for each TargetImage in TargetImages
        Rank = GetDistance(Centroid, TargetImage,
            distanceType = cosineSimilarity)
        SaveInTripleDB(POP_i, TargetImage, Rank)
    end for
end for
```

FIGS. 2-7 illustrate exemplary operations for obtaining enrichment data as may be performed by an enrichment system. The composition system, e.g., composition system 120 of FIGS. 1 and 2, may access the knowledge model and further process the life logging data and enrichment data (hereafter referred to collectively as "enriched data").

Figure 9:
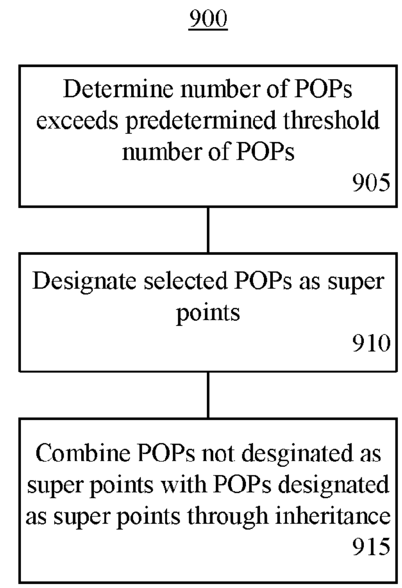
FIG. 9 is a flow chart illustrating another exemplary method of composition.
Figure 8:
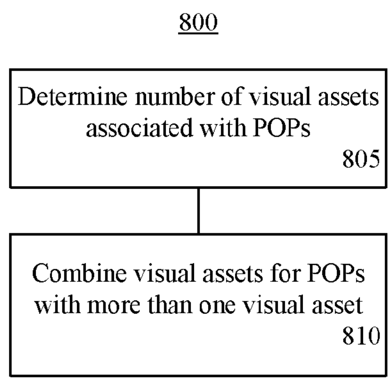
FIG. 8 is a flow chart illustrating an exemplary method of composition.

FIGS. 8-9 illustrate exemplary methods of composition. More particularly, methods 8-9 illustrate exemplary methods of summarization of enriched data. In many cases, known summarization techniques are intended to operate on large collections of data or images. For example, known summarization techniques are often applied to data sets including hundreds or thousands of items. In one example, the number of visual assets may be, on average, fewer than 15 with an upper limit of approximately 30.

Within compositions generated as described within this disclosure, a visual asset may be displayed for approximately 5 seconds. In cases where the visual asset is associated with additional data to be displayed such as visual effects, annotations, facts, and the like, the visual asset and other data may be displayed for a longer period of time such as for approximately 8 to 12 seconds. As such, the composition may have a playback duration that is longer than 2 to 3 minutes. Summarization may be applied to reduce the playback duration of a composition and/or to maintain a playback duration in a desired range, e.g., 2 to 3 minutes.

As noted, FIG. 8 is a flow chart illustrating an exemplary method 800 of composition. Method 800 illustrates an exemplary method of summarizing the enriched data as may be performed by the composition system described with reference to FIG. 1.

In block 805, the composition system may determine the number of UGD visual assets, e.g., images, associated with the POPs. In block 810, for those POPs having more than one UGD visual asset, the composition system may convert separate visual assets into a geometric arrangement of the plurality of visual assets that may be displayed on a user display. The geometric arrangement ensures that the plurality of visual assets are displayed concurrently. The visual assets may be combined into single frame with annotations associated with the POP and other information such as location information.

FIG. 9 is a flow chart illustrating another exemplary method 900 of composition. Method 900 illustrates an exemplary method of summarizing the enriched data as may be performed by the composition system.

In block 905, the composition system may determine that the number of POPs to be used for the multimedia composition (e.g., the POPs of the trajectory data) exceeds a predetermined threshold number POPs. In cases where the number of visual assets per POP is small, e.g., below a predetermined threshold number of visual assets, and the number of POPs is large, e.g., above a predetermined threshold number of POPs, it may be impractical to create a scene per POP. In some circumstances, for example, the composition system may be configured to generate a multimedia composition where 0 to 3 images are displayed sequentially in overlay arrangements with additional text, icons, and transparent backgrounds.

In block 910, responsive to determining that the number of POPs exceeds the predetermined threshold number of POPs, the composition system may designate, e.g., tag, selected POPs of the set of POPs to be used for the multimedia composition as super points. In cases where the number of POPs does not exceed the predetermined threshold number of POPs, the remainder of method 900 need not be performed. In that case, all POPs of the trajectory data may be used in the multimedia composition.

Continuing with block 910, the composition system may designate a subset of the set of POPs of the trajectory data as super points. The super points, as opposed to all POPs of the trajectory data, may be used for the multimedia composition. The composition system may create a story using the super points, excluding those POPs not designated as super points from the composition.

In one arrangement, the composition system may designate a POP as a super point if either one or both of two conditions apply. The first condition is whether the amount of time between the POP and the prior POP exceeds a time threshold $\tau$. For example, a particular $POP_i$ being evaluated may be defined, in part, by ($latitude_i$, $longitude_i$, $time_i$). The POP immediately prior to $POP_i$, i.e., $POP_{i-1}$, may be defined, in part, by ($latitude_{i-1}$, $longitude_{i-1}$, $time_{i-1}$). If $time_i - time_{i-1} > \tau$, then the composition system may designate $POP_i$ as a super point.

The second condition is whether the distance between $POP_i$ and $POP_{i-1}$ exceeds a distance threshold $\delta$. If distance ($POP_i$, $POP_{i-1}$)>$\delta$, then the composition system may designate POP, as a super point. In the distance determination, distance may be calculated as the straight distance between two geo-locations. The values $\tau$ and $\delta$ may be fixed as system settings or may be computed dynamically by the composition system as a fraction of the total time for $\tau$ amd/or as a fraction of the total distance for $\delta$ of the trajectory defined by the POPs to be used for the multimedia composition. In one arrangement, the composition system may always consider the first POP, i.e., $POP_0$, as a super point.

In block 915, the composition system may combine POPs of the trajectory that are not designated as super points with POPs of the trajectory that are designated as super points through inheritance. In one arrangement, POPs not designated as super points may be automatically assigned to the previous super point. For example, consider the case where $POP_i$ and $POP_j$ are both super points with $time_i < time_j$. In that case, any POPs between $POP_i$ and $POP_j$ that are not designated as super points may be assigned to $POP_i$. A super point may inherit the visual assets, e.g., all the visual assets, from the assigned POPs.

Subsequent to assignment, or inheritance, a super point may have a much larger collection of visual assets. In one arrangement, the method illustrated in FIG. 8 may be implemented again to continue summarization.

In another arrangement, the composition system may be configured to generate connective messages. Due to spatial and temporal ordering, the visual assets associated with a trajectory having a plurality of POPs already have a notion of spatial and temporal connectedness. The story of the multimedia composition maintains the spatial and temporal ordering to preserve the pattern of connectedness.

In one arrangement, each summarized super point may generate a scene in the multimedia composition. Each scene may have text that either provides some description about the scene or that connects the scene with the story flow. The composition system may determine whether a POP has an annotation. If so, the composition system may generate a scene in the multimedia composition as a super point and add the annotation to a main, or primary, visual asset of the scene (the super point defining the scene) to describe the scene.

In another arrangement, the composition system may use synthetic text dialogs as connective messages. Examples of synthetic dialogs include may include, but are not limited to: "After 5 minutes", "The same day in the afternoon", "20 miles north of San Diego", etc., as may be determined from consecutive POPs of the multimedia composition or consecutive super points. In one exemplary implementation, the composition system may generate the synthetic dialogs using a Finite State Machine to prevent repetitiveness and generate dialogs linked to previous messages displayed in scenes.

The composition system may generate a manifest. The manifest may be a data structure that declares directives for rendering the different composition elements that generate the multimedia composition. In one example, the manifest may be encoded as a JSON object and may be distributed as a file to one or more client devices over a network. The manifest may include two distinctive sections. The sections may include a header section conveying general information about the story including title, playback duration, creation date, etc., and a scene description section conveying the spatio-temporal directives for placing composition elements on a screen.

Figure 10:
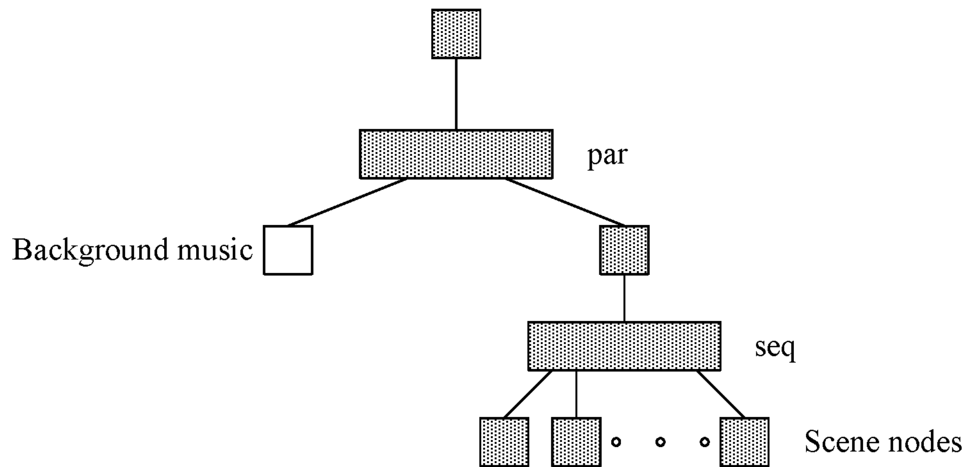
FIG. 10 is a block diagram illustrating an exemplary top level tree structure showing a group of scenes and background music.
Figure 11:
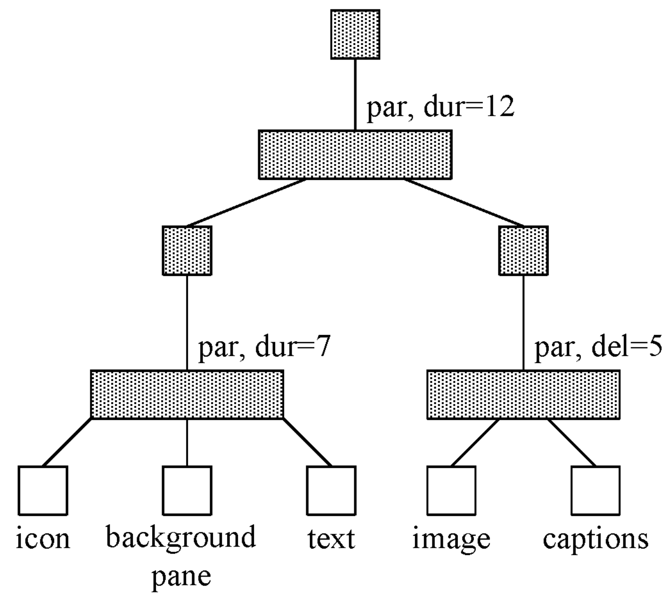
FIG. 11 is a block diagram illustrating an example of a scene tree structure showing composition elements displayed at different times.

In one aspect, the spatio-temporal directives may be specified using tree structures as illustrated in FIGS. 10 and 11. FIG. 10 is a block diagram illustrating an exemplary top level tree structure showing a group of scenes and background music. FIG. 11 is a block diagram illustrating an example of a scene tree structure showing composition elements displayed at different times.

In FIGS. 10 and 11, the shaded blocks represent intermediate nodes whereas unshaded blocks terminal nodes. A terminal node describes a single composition element such as a picture, an audio clip, text, or a transparent pane. Terminal nodes may have properties such as insertion effects, exit effects, a target layer, and element duration. The target layer may indicate the spatial location for an element on the screen, while the duration property may indicate how long the element stays on the screen.

Rectangular bars represent arrays of children nodes. Children arrays may also have properties. One exemplary property is the array type. The array type may be either "par" or "seq". The "par" array type indicates that the children are displayed in parallel, e.g., concurrently. The "seq" array type indicates that the children are displayed sequentially. In addition, children arrays may have a delay property to indicate a temporal delay of the entire array at the time of rendering in the client device. Children elements of type "par" may have a duration property to indicate the total temporal duration for display at the time of rendering within the client device. For example, the tree depicted in FIG. 11 shows a parent array with duration of 12 seconds. The left branch, which may control the left side of the screen, is rendered for 7 seconds. The right branch, which may control the right side of the screen, is rendered with a delay of 5 seconds.

As noted, the manifest may be distributed to any of a variety of different devices for rendering. The device, executing manifest playback software, may parse the manifest directives and create the multimedia composition for playback. The use of Web technologies for presentations has an advantage over conventional movie formats such as MP4 in that Web technologies provide interactivity. In one aspect, the manifests may be interactive. Interactivity may add multiple concurrent non-linear storylines, which may be selected by a user during playback within the device.

In one aspect, the player application may be deployed using one or more different client languages. In one example, the player application may be implemented as a JavaScript application, thought the inventive arrangements are not intended to be limited to one particular implementation. A browser capable of playing HTML5, CSS3, and jQuery/JavaScript may be used as a player. The browser, for example, may download scripts from a Web server and run the scripts locally. During runtime, the player application may download the manifest containing the composition directives for rendering a story from the Web server. The player application may interpret the manifest and generate the time-dependent audiovisual elements that create a movie-style composition.

Figure 12:
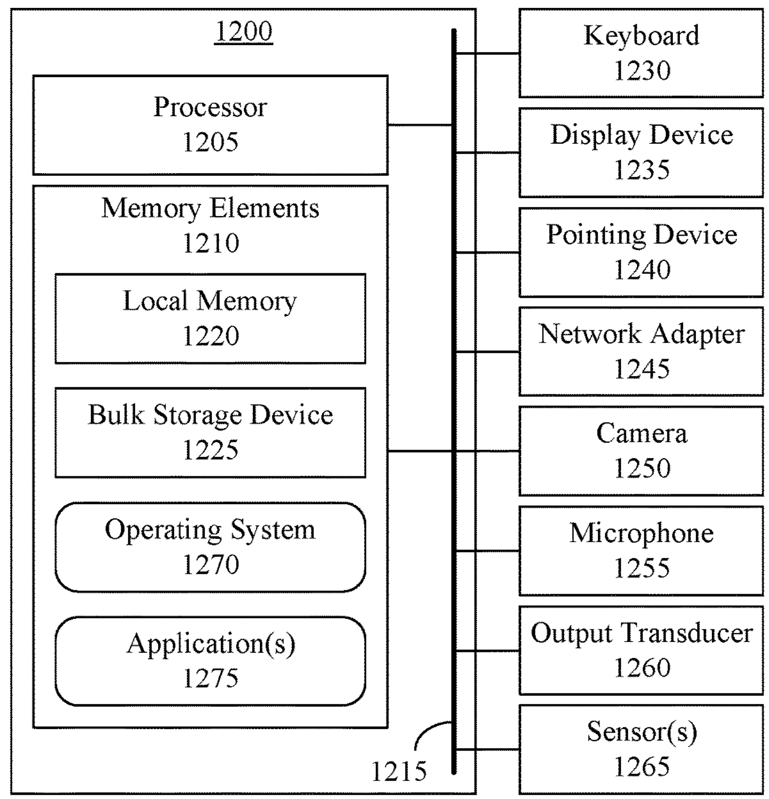
FIG. 12 is a block diagram illustrating an exemplary architecture for a data processing system.

FIG. 12 is a block diagram illustrating an exemplary architecture 1200 for a data processing system. Architecture 1200 may be used to implement any of a variety of systems and/or devices that include a processor and memory and that are capable of performing the operations described within this disclosure for a client device. For example, architecture 1200 may be used to implement client device 105 and/or client devices 110. In some cases, the particular device implemented using architecture 1200 may include fewer components than shown or more components than shown. Further, the particular operating system and/or application(s) included may vary.

As pictured, architecture 1200 includes at least one processor, e.g., a central processing unit (CPU), 1205 coupled to memory elements 1210 through a system bus 1215 or other suitable circuitry. Architecture 1200 stores program code within memory elements 1210. Processor 1205 executes the program code accessed from memory elements 1210 via system bus 1215. Memory elements 1210 include one or more physical memory devices such as, for example, a local memory 1220 and one or more bulk storage devices 1225. Local memory 1220 refers to random access memory (RAM) or other non-persistent memory device(s) generally used during actual execution of the program code. Bulk storage device 1225 may be implemented as a hard disk drive (HDD), a solid state drive (SSD), or another persistent data storage device. Architecture 1200 may also include one or more cache memories (not shown) that provide temporary storage of at least some program code in order to reduce the number of times program code must be retrieved from bulk storage device 1225 during execution.

Input/output (I/O) devices such as a keyboard 1230, a display device 1235, and a pointing device 1240 may optionally be coupled to architecture 1200. In some cases, one or more of the I/O devices may be combined as in the case where a touchscreen is used as display device 1235. In that case, display device 1235 may also implement keyboard 1230 and pointing device 1240. One or more network adapters 1245 may also be coupled to architecture 1200 to enable architecture 1200 to become coupled to other systems, computer systems, remote printers, and/or remote storage devices through intervening private or public networks. Modems, cable modems, Ethernet cards, and wireless transceivers (e.g., wireless radios) are examples of different types of network adapter 1245 that may be used with architecture 1200. Depending upon the particular device implemented with architecture 1200, the specific type of network adapter, or network adapters as the case may be, will vary.

The I/O devices may also include a camera 1250, a microphone 1255, and an output transducer 1260. Output transducer 1260 may be a speaker. One or more other I/O devices illustrated as sensors 1265 may be coupled to architecture 1200. Examples of sensors 1265 may include, but are not limited to, accelerometers, gyroscopes, light sensors, biological and/or medical sensors, and the like. The various I/O devices and/or sensors described herein may be coupled to architecture 1200 either directly or through intervening I/O controllers. An amplifier or other driver circuit may be used to couple output transducer 1260 to architecture 1200.

As pictured in FIG. 12, memory elements 1210 store an operating system 1270 and one or more applications 1275. Application 1275 may be a life logging application that, when executed, causes a system using architecture 1200 to perform the various operations described herein. In one aspect, operating system 1270 and application(s) 1275, being implemented in the form of executable program code, are executed by architecture 1200. As such, operating system 1270 and application(s) 275 may be considered an integrated part of architecture 1200. Operating system 270, application(s) 1275, and any data items used, generated, and/or operated upon by architecture 1200, are functional data structures that impart functionality when employed as part of a system implemented using architecture 200.

Figure 13:
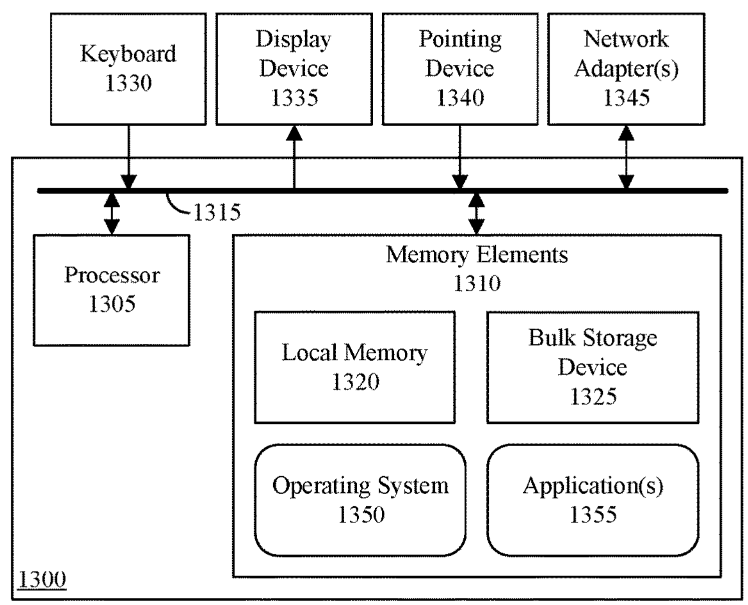
FIG. 13 is a block diagram illustrating another exemplary architecture for a data processing system.

FIG. 13 is a block diagram illustrating an exemplary architecture 1300 for a data processing system. Architecture 1300, for example, may be used to implement enrichment system 115 and/or composition system 120 as described herein. Architecture 1300 includes at least one processor 1305, e.g., a central processing unit (CPU), coupled to memory elements 1310 through a system bus 1315 or other suitable circuitry. Architecture 1300 stores program code within memory elements 1310. Processor 1305 executes the program code accessed from memory elements 1310 via system bus 1315. In one aspect, architecture 1300 may be used to implement a computer or other data processing system that is suitable for storing and/or executing program code. It should be appreciated, however, that architecture 1300 may be used to implement any system including a processor and memory that is capable of performing the functions described within this disclosure.

Memory elements 1310 include one or more physical memory devices such as, for example, a local memory 1320 and one or more bulk storage devices 1325. Local memory 1320 may be implemented as RAM or other non-persistent memory device(s) generally used during actual execution of the program code. Bulk storage device 1325 may be implemented as a hard disk drive (HDD), solid state drive (SSD), or other persistent data storage device. Architecture 1300 also may include one or more cache memories (not shown) that provide temporary storage of at least some program code in order to reduce the number of times program code must be retrieved from the bulk storage device during execution.

Input/output (I/O) devices such as a keyboard 1330, a display device 1335, and a pointing device 1340 optionally may be coupled to architecture 1300. The I/O devices may be coupled to architecture 1300 either directly or through intervening I/O controllers. A network adapter 1345 may also be coupled to architecture 1300 to enable a system implemented using architecture 1300 to become coupled to other systems, computer systems, remote printers, remote storage devices, or the like through intervening private or public networks. Modems, cable modems, Ethernet cards, and wireless transceivers are examples of different types of network adapter 1345 that may be used with architecture 1300.

Memory elements 1310 may store an operating system 1350 and an application 1355. In one aspect, application 1355 may be an enrichment application. In another aspect, application 1355 may be a composition application. Application 1355, being implemented in the form of executable program code, is executed by architecture 1300. As such, application 1355 is considered an integrated part of any system implemented using architecture 1300. Application 1355 and any data items used, generated, and/or operated upon by architecture 1300 while executing application 1355 are functional data structures that impart functionality when employed as part of architecture 1300.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of enhancing user experience through trajectory data enrichment may include determining, using a processor, enrichment data items related to POPs within trajectory data, wherein the enrichment data items are retrieved from a data source, determining, using the processor, ranking metrics for the enrichment data items, ranking, using the processor, the enrichment data items according to the ranking metrics, and providing, to a device and using the processor, at least one ranked enrichment data item in association with the related POP of the trajectory data.

Determining enrichment data items related to POPs may include generating a query for the data source specifying at least one attribute of at least one selected POP of the trajectory data and, responsive to submitting the query to the data source, receiving at least one enrichment data item for the at least one selected POP.

In one aspect, the enrichment data items may include facts. In that case, determining enrichment data items may include, for POPs having an annotation, retrieving, from the data source, descriptive text for named entities found in the annotation and separating the descriptive text into sentences, wherein each sentence is a fact. Ranking may include ranking the facts according to a cost function that depends upon a measure of informativeness and sentence length. The method may also include determining the measure of informativeness by normalizing a number of named entities in the fact by a length of the fact.

In another aspect, the enrichment data items may include landmarks. Accordingly, determining enrichment data items may include determining landmarks associated with POPs of the trajectory data according to distance of the landmarks from the POPs and popularity of the landmarks.

In yet another aspect, the enrichment data items may include visual assets. Accordingly, determining enrichment data items may include determining a term describing an attribute of a POP, determining a synonym for the term, and, responsive to submitting a query to the data source, wherein the query specifies a location of a POP, the term, and the synonym, receiving a plurality of visual assets and visual asset scores. Visual assets that have a detectable face from the plurality of visual assets may be excluded. As noted, exclusion of visual assets that include detectable faces may be optional. Ranking may include ranking the plurality of visual assets according to the scores.

In another arrangement where the enrichment data items include visual assets, determining enrichment data items may include, responsive to submitting a query to a social networking system, wherein the query specifies a location of a POP, receiving a plurality of visual assets and associated descriptions. Visual assets that have a detectable face may be excluded from the plurality of visual assets. Exclusion of visual assets that include detectable faces may be optional. Ranking may include ranking the plurality of visual assets according to relevance of the visual assets determined according to uniqueness of terms in the descriptions for the visual assets.

A system may include a processor programmed to initiate executable operations for enhancing user experience through trajectory data enrichment. The executable operations may include determining enrichment data items related to POPs within trajectory data, wherein the enrichment data items are retrieved from a data source, determining ranking metrics for the enrichment data items, ranking the enrichment data items according to the ranking metrics, and providing, to a device, at least one ranked enrichment data item in association with the related POP of the trajectory data.

Determining enrichment data items related to POPs may include generating a query for the data source specifying at least one attribute of at least one selected POP of the trajectory data and, responsive to submitting the query to the data source, receiving at least one enrichment data item for the at least one selected POP.

In one aspect, the enrichment data items may include facts. Accordingly, determining enrichment data items may include, for POPs having an annotation, retrieving, from the data source, descriptive text for named entities found in the annotation and separating the descriptive text into sentences, wherein each sentence is a fact. Ranking may include ranking the facts according to a cost function that depends upon a measure of informativeness and sentence length. The processor may be further programmed to initiate executable operations including determining the measure of informativeness by normalizing a number of named entities in the fact by a length of the fact.

In another aspect, the enrichment data items may include landmarks. In that case, determining enrichment data items may include determining landmarks associated with POPs of the trajectory data according to distance of the landmarks from the POPs and popularity of the landmarks.

In still another aspect, the enrichment data items may include visual assets. Accordingly, determining enrichment data items may include determining a term describing an attribute of a POP, determining a synonym for the term, and, responsive to submitting a query to a visual asset data source, wherein the query specifies a location of a POP, the term, and the synonym, receiving a plurality of visual assets and visual asset scores. Visual assets that have a detectable face may be excluded from the plurality of visual assets. Exclusion of visual assets that include detectable faces may be optional. Ranking may include ranking the plurality of visual assets according to the scores.

In another arrangement where the enrichment data items include visual assets, determining enrichment data items may include, responsive to submitting a query to a social networking system, wherein the query specifies a location of a POP, receiving a plurality of visual assets and associated descriptions. Visual assets that have a detectable face may be excluded from the plurality of visual assets. Exclusion of visual assets that include detectable faces may be optional. Ranking may include ranking the plurality of visual assets according to relevance of the visual assets determined according to uniqueness of terms in the descriptions for the visual assets.

A computer program product may include a computer readable storage medium having program code stored thereon for enriching trajectory data from a device. The program code may be executable by a processor to perform a method. The method may include determining, using the processor, enrichment data items related to POPs within trajectory data, wherein the enrichment data items are retrieved from a data source, determining, using the processor, ranking metrics for the enrichment data items, ranking, using the processor, the enrichment data items according to the ranking metrics, and providing, to a device and using the processor, at least one ranked enrichment data item in association with the related point of presence of the trajectory data.

Determining enrichment data items related to POPs may include generating a query for the data source specifying at least one attribute of at least one selected POP of the trajectory data and, responsive to submitting the query to the data source, receiving at least one enrichment data item for the at least one selected POP.

The enrichment data items may include facts. Accordingly, determining enrichment data items may include, for POPs having an annotation, retrieving, from the data source, descriptive text for named entities found in the annotation and separating the descriptive text into sentences, wherein each sentence is a fact. Ranking may include ranking the facts according to a cost function that depends upon a measure of informativeness and sentence length.

In another aspect, the enrichment data items may include landmarks. In that case, determining enrichment data items may include determining landmarks associated with POPs of the trajectory data according to distance of the landmarks from the POPs and popularity of the landmarks.

In still another aspect, the enrichment data items may include visual assets. Accordingly, determining enrichment data items may include determining a term describing an attribute of a POP, determining a synonym for the term, and, responsive to submitting a query to a visual asset data source, wherein the query specifies a location of a POP, the term, and the synonym, receiving a plurality of visual assets and visual asset scores. Visual assets that have a detectable face may be excluded from the plurality of visual assets. Exclusion of visual assets that include detectable faces may be optional. Ranking may include ranking the plurality of visual assets according to the scores.

In another arrangement, where the enrichment data items include visual assets, determining enrichment data may include, responsive to submitting a query to a social networking system, wherein the query specifies a location of a POP, receiving a plurality of visual assets and associated descriptions and excluding visual assets that have a detectable face from the plurality of visual assets. Exclusion of visual assets that include detectable faces may be optional. Ranking may include ranking the plurality of visual assets according to relevance of the visual assets determined according to uniqueness of terms in the descriptions for the visual assets.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:

in response to receiving user generated data including a plurality of visual assets and corresponding trajectory data from a first user device, determining, using a processor, enrichment data items related to a plurality of points of presence within the trajectory data, wherein the points of presence specify time and location data for the first user device;

determining, using the processor, ranking metrics for the enrichment data items;

ranking, using the processor, the enrichment data items according to the ranking metrics;

in response to determining a difference between properties of a first point of presence of the plurality of points of presence corresponding to a first visual asset of the plurality of visual assets and a second point of presence of the plurality of points of presence corresponding to a second visual asset of the plurality of visual assets, generating, using the processor, a connective message, wherein the connective message is synthetic text dialog describing the difference and generated using a finite state machine configured to prevent repetitiveness of connective messages and generate dialog linked to previous messages displayed in scenes of a multimedia composition;

generating, using the processor, a manifest specifying directives for generating the multimedia composition including the first visual asset linked to the second visual asset by the connective message and at least one ranked enrichment data item in association with the related plurality of points of presence; and providing the manifest to a second user device, wherein the second user device implements the directives to generate the multimedia composition.

2. The method of claim 1, wherein the multimedia composition is interactive and specifies a plurality of concurrent non-linear storylines that are selectable during playback.

3. The method of claim 1, wherein the enrichment data items comprise facts, and wherein:

the determining the enrichment data items comprises:

for points of presence of the plurality of points of presence having an annotation, retrieving, from the external data source, descriptive text for named entities found in the annotation; and separating the descriptive text into sentences, wherein each sentence is a fact; and the ranking comprises ranking the facts according to a cost function that depends upon a measure of informativeness and sentence length.

4. The method of claim 3, further comprising:

determining the measure of informativeness by normalizing a number of the named entities in the fact by a length of the fact.

5. The method of claim 1, wherein the determining the enrichment data items comprises:

determining landmarks associated with the plurality of points of presence of the trajectory data according to distance of the landmarks from the plurality of points of presence and popularity of the landmarks.

6. The method of claim 1, wherein the enrichment data items comprise visual assets, and the determining the enrichment data items comprises:

determining a term describing an attribute of a selected point of presence from the plurality of points of presence within the trajectory data;

determining a synonym for the term;

responsive to submitting a query, wherein the query specifies a location of the selected point of presence, the term, and the synonym, receiving a plurality of visual assets and visual asset scores; and excluding each visual asset that has a detectable face from the plurality of visual assets received;

wherein the ranking comprises ranking the plurality of visual assets according to the scores after the excluding.

7. The method of claim 1, wherein the enrichment data items comprise visual assets, and the determining the enrichment data items comprises:

responsive to submitting a query to a social networking system, wherein the query specifies a location of a selected point of presence from the plurality of points of presence within the trajectory data, receiving a plurality of visual assets and associated descriptions from the social networking system; and excluding each visual asset that has a detectable face from the plurality of visual assets received from the social networking system;

wherein the ranking comprises ranking the plurality of visual assets according to relevance of the visual assets determined according to uniqueness of terms in the descriptions for the visual assets after the excluding.

8. A system, comprising:

a processor programmed to initiate executable operations including:

in response to receiving user generated data including a plurality of visual assets and corresponding trajectory data from a user first device, determining enrichment data items related to a plurality of points of presence within the trajectory data, wherein the points of presence specify time and location data for the first user device;

determining ranking metrics for the enrichment data items;

ranking the enrichment data items according to the ranking metrics;

in response to determining a difference between properties of a first point of presence of the plurality of points of presence corresponding to a first visual asset of the plurality of visual assets and a second point of presence of the plurality of points of presence corresponding to a second visual asset of the plurality of visual assets, generating a connective message, wherein the connective message is synthetic text dialog describing the difference and generated using a finite state machine configured to prevent repetitiveness of connective messages and generate dialog linked to previous messages displayed in scenes of a multimedia composition;

generating, a manifest specifying directives for generating the multimedia composition including the first visual asset linked to the second visual asset by the connective message and at least one ranked enrichment data item in association with the related plurality of points of presence; and providing the manifest to a second user device, wherein the second user device implements the directives to generate the multimedia composition.

9. The system of claim 8, wherein the multimedia composition is interactive and specifies a plurality of concurrent non-linear storylines that are selectable during playback.

10. The system of claim 9, wherein the enrichment data items comprise facts, and wherein:

the determining the enrichment data items comprises:

for points of presence of the plurality of points of presence having an annotation, retrieving descriptive text for named entities found in the annotation; and separating the descriptive text into sentences, wherein each sentence is a fact; and the ranking comprises ranking the facts according to a cost function that depends upon a measure of informativeness and sentence length.

11. The system of claim 10, wherein the processor is further programmed to initiate executable operations comprising:

determining the measure of informativeness by normalizing a number of the named entities in the fact by a length of the fact.

12. The system of claim 9, wherein the determining the enrichment data items comprises:

determining landmarks associated with the plurality of points of presence of the trajectory data according to distance of the landmarks from the plurality of points of presence and popularity of the landmarks.

13. The system of claim 9, wherein the enrichment data items comprise visual assets, and the determining the enrichment data items comprises:

determining a term describing an attribute of a selected point of presence from the plurality of points of presence within the trajectory data;

determining a synonym for the term;

responsive to submitting a query, wherein the query specifies a location of the selected point of presence, the term, and the synonym, receiving a plurality of visual assets and visual asset scores; and excluding each visual asset that has a detectable face from the plurality of visual assets received;

wherein the ranking comprises ranking the plurality of visual assets according to the scores after the excluding.

14. The system of claim 9, wherein the enrichment data items comprise visual assets, and the determining the enrichment data items comprises:

responsive to submitting a query to a social networking system, wherein the query specifies a location of a selected point of presence from the plurality of points of presence within the trajectory data, receiving a plurality of visual assets and associated descriptions from the social networking system; and excluding each visual asset that has a detectable face from the plurality of visual assets received from the social networking system;

wherein the ranking comprises ranking the plurality of visual assets according to relevance of the visual assets determined according to uniqueness of terms in the descriptions for the visual assets after the excluding.

15. A computer program product comprising a computer readable storage medium having program code stored thereon for enriching trajectory data from a device, the program code executable by a processor to perform a method comprising:

in response to receiving user generated data including a plurality of visual assets and corresponding trajectory data from a first user device, determining, using the processor, enrichment data items related to a plurality of points of presence within the trajectory data, wherein the points of presence specify time and location data for the first user device;

determining, using the processor, ranking metrics for the enrichment data items;

ranking, using the processor, the enrichment data items according to the ranking metrics;

in response to determining a difference between properties of a first point of presence of the plurality of points of presence corresponding to a first visual asset of the plurality of visual assets and a second point of presence of the plurality of points of presence corresponding to a second visual asset of the plurality of visual assets, generating, using the processor, a connective message, wherein the connective message is synthetic text dialog describing the difference and generated using a finite state machine configured to prevent repetitiveness of connective messages and generate dialog linked to previous messages displayed in scenes of a multimedia composition;

generating, using the processor, a manifest specifying directives for generating the multimedia composition including the first visual asset linked to the second visual asset by the connective message and at least one ranked enrichment data item in association with the related plurality of points of presence; and providing the manifest to a second user device, wherein the second user device implements the directives to generate the multimedia composition.

16. The computer program product of claim 15, wherein the multimedia composition is interactive and specifies a plurality of concurrent non-linear storylines that are selectable during playback.

17. The computer program product of claim 16, wherein the enrichment data items comprise facts, and wherein:

the determining the enrichment data items comprises:

for points of presence of the plurality of points of presence having an annotation, retrieving descriptive text for named entities found in the annotation; and separating the descriptive text into sentences, wherein each sentence is a fact; and the ranking comprises ranking the facts according to a cost function that depends upon a measure of informativeness and sentence length.

18. The computer program product of claim 15, wherein the determining enrichment data items comprises:

determining landmarks associated with the plurality of points of presence of the trajectory data according to distance of the landmarks from the plurality of points of presence and popularity of the landmarks.

19. The computer program product of claim 15, wherein the enrichment data items comprise visual assets, and the determining the enrichment data items comprises:

determining a term describing an attribute of a selected point of presence from the plurality of points of presence within the trajectory data;

determining a synonym for the term;

responsive to submitting a query, wherein the query specifies a location of the selected point of presence, the term, and the synonym, receiving a plurality of visual assets and visual asset scores; and excluding each visual asset that has a detectable face from the plurality of visual assets received;

wherein the ranking comprises ranking the plurality of visual assets according to the scores after the excluding.

20. The computer program product of claim 15, wherein the enrichment data items comprise visual assets, and the determining the enrichment data items comprises:

responsive to submitting a query to a social networking system, wherein the query specifies a location of a selected point of presence from the plurality of points of presence within the trajectory data, receiving a plurality of visual assets and associated descriptions from the social networking system; and excluding each visual asset that has a detectable face from the plurality of visual assets received from the social networking system;

wherein the ranking comprises ranking the plurality of visual assets according to relevance of the visual assets determined according to uniqueness of terms in the descriptions for the visual assets after the excluding.

* * * * *